US009036532B2

(12) United States Patent
Lim et al.

(10) Patent No.: US 9,036,532 B2
(45) Date of Patent: May 19, 2015

(54) SCHEDULING METHOD FOR MACHINE-TO-MACHINE COMMUNICATION

(75) Inventors: Jaewon Lim, Anyang-si (KR); Suhwook Kim, Anyang-si (KR); Bonghoe Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 156 days.

(21) Appl. No.: 13/814,264

(22) PCT Filed: Jan. 13, 2011

(86) PCT No.: PCT/KR2011/000263
§ 371 (c)(1),
(2), (4) Date: Feb. 5, 2013

(87) PCT Pub. No.: WO2012/057407
PCT Pub. Date: May 3, 2012

(65) Prior Publication Data
US 2013/0163495 A1 Jun. 27, 2013

Related U.S. Application Data

(60) Provisional application No. 61/407,026, filed on Oct. 27, 2010.

(51) Int. Cl.
*H04W 4/08* (2009.01)
*H04W 72/12* (2009.01)
*H04W 4/00* (2009.01)
*H04L 29/08* (2006.01)

(52) U.S. Cl.
CPC .............. *H04W 4/08* (2013.01); *H04W 72/121* (2013.01); *H04W 4/005* (2013.01); *H04L 67/12* (2013.01)

(58) Field of Classification Search
None
See application file for complete search history.

(56) References Cited

U.S. PATENT DOCUMENTS

| 6,983,409 | B1* | 1/2006 | Vollmer et al. ............... 714/748 |
| 7,965,706 | B2* | 6/2011 | Iwakawa et al. ............... 370/360 |
| 2002/0007387 | A1* | 1/2002 | Ginsberg ..................... 709/102 |
| 2009/0016317 | A1 | 1/2009 | Wu et al. |
| 2011/0065442 | A1 | 3/2011 | Kim et al. |
| 2011/0191826 | A1* | 8/2011 | Ballal et al. ..................... 726/4 |

FOREIGN PATENT DOCUMENTS

| KR | 10-2009-0129326 A | 12/2009 |
| KR | 10-2010-0043218 A | 4/2010 |
| KR | 10-2010-0088773 A | 8/2010 |

* cited by examiner

*Primary Examiner* — Chi H Pham
*Assistant Examiner* — Shick Hom
(74) *Attorney, Agent, or Firm* — Birch, Stewart, Kolasch & Birch, LLP

(57) ABSTRACT

One embodiment of the present invention provides a scheduling method for machine-to-machine (M2M) communication. The method comprises the steps of: receiving a connection request message from each of a plurality of machines; grouping the plurality of machines into one or more groups; transmitting information on the group to which each machine belongs, to the machine; transmitting information on the machines belonging to each group, and control information including information on a time interval allocated to each group, to machines belonging to each group; and communicating with machines belonging to each group in a time interval allocated to each group.

20 Claims, 8 Drawing Sheets

SCHEDULING METHOD FOR
MACHINE-TO-MACHINE COMMUNICATION

CROSS REFERENCE TO RELATED APPLICATIONS

This non-provisional application is a National Stage entry under U.S.C. §371 of International Application No. PCT/KR2011/000263 filed on Jan. 13, 2011, which claims the benefit of U.S. Provisional Application No. 61/407,026 filed on Oct. 27, 2010. The entire contents of all of the above applications are hereby incorporated by reference.

TECHNICAL FIELD

The present invention relates to a machine-to-machine (hereinafter abbreviated M2M) communication.

BACKGROUND ART

Generally, the second generation mobile communication means that audio is transmitted and received by being digitized and includes CDMA, GSM or the like. GPRS evolved from the GSM has been proposed. And, the GPRS is the technology for providing a packet switched data service based on the GSM system.

The third generation mobile communication means that images and data can be transmitted/received as well as audio. The 3GPP ($3^{rd}$ generation partnership project) has developed the mobile communication system (IMT-2000) technology and has adopted WCDMA as a radio access technology (hereinafter abbreviated RAT). Thus, the IMT-2000 technology and the radio access technology (RAT) (e.g., WCDMA) are generically called UMTS (universal mobile telecommunication system) in Europe. And, UMTS Terrestrial Radio Access Network is abbreviated UTRAN.

Meanwhile, the third generation mobile communication is evolving into the $4^{th}$ generation mobile communication.

The fourth generation mobile communication technology has proposed LTE (long-term evolution network) technology in the course of being standardized by 3GPP and IEEE 802.16 technology in the course of being standardized by IEEE. The LTE uses such a terminology as E-UTRAN (evolved-UTRAN).

Meanwhile, in order to enable communication of data, which are generated by machines without user's interference, in the third or fourth generation mobile communication system as well as data generated by a user, the concept of the M2M (machine-to-machine) communication has been proposed.

The M2M communication may mean a method and system for communication between machines without human interference. In particular, the M2M communication means the system that enables the communication between a machine and an information system of a company, the communication between machines (machine-to-machine), the communication between a machine and a mobile communication terminal (e.g., mobile-to-machine, machine-to-mobile, etc.) and the like.

Moreover, the M2M communication may be used when all the sensors, actuators, middleware, software and application, which enable efficiency and quality to be enhanced in a manner that numerous sensors and actuators are linked to each other on a specific business process, are taken together.

The M2M communication is based on the idea that a network connected to machines is able to provide a further meaningful result when the corresponding machines form the network. To this end, various kinds of heterogeneous wire/wireless communication technologies and software technologies need to be combined together.

FIG. 1 is a diagram for one example of M2M communication.

Referring to FIG. 1, a machine 10 is a device equipped with a unique function and includes an electronic device that is communication-connectible. For instance, the machine 10 may include one of a vending machine, a washer, a refrigerator, a health machine and various kinds of sensors. In particular, the various kinds of the sensors may include a water meter, an electricity meter, a gas meter and the like. And, the various kinds of the sensors may include an ozone sensor, a carbon monoxide sensor, a fire sensor, a crime prevention sensor and the like.

The above-configured machine 10 is equipped with a communication function and may be able to perform a communication with a service server 70 via an AP (access point) 30.

In the following description, one example of application of the M2M communication is explained.

First of all, the concept of a smart grid is recently proposed to control community-based resources including power networks, tap water, electricity, gas and the like.

FIG. 2 shows the concept of a smart grid proposed recently and newly.

The smart grid means a next generation power network intending to optimize energy efficiency by exchanging real-time information interactively between a power supplier and a consumer in a manner of applying IT technologies to a power plant, a substation, a power transmission station, a power consumer and the like. Hence, it is able to raise efficiency in a manner that the power supplier and the consumer are interactive.

In order to describe the smart grid, it is necessary to explain a current power system in the first place. It is designed to produce electricity more than that of an actual use amount by 10%. The produced electricity is set suitable for a maximum consumption amount to prepare for a case of overuse. To this end, various power generating equipments are additionally required as well as fuel. Yet, since there is a considerable amount of wasted electricity, it lowers energy efficiency. And, an amount of discharged carbon dioxide increases in the course of burning coal, petroleum, gas and the like.

If the exact amount of necessary electricity is produced or electricity is usable in response to a produced amount of electricity, it is able to use electricity more efficiently while preventing the global warming. To achieve the goals, the smart grid technology is able to provide an electricity used amount, an electricity supplied amount and a state of power line by converging IT technology on the power grid.

If this technology is adopted, a consumer is able to use electricity when electric charges are low. And, an electronic device can be automatically operated during hours of low electric charges.

In aspect of a power producer, since a real-time power use status can be obtained, it is able to adjust a power supply amount flexibly. Since it may be unnecessary to maintain a maximum power amount during hours of less power use, it is able to reduce the wasted electricity. And, the electricity is saved and then supplied during hours of more power use, thereby enabling a flexible operation and management of electricity. Moreover, it is able to prevent malfunction of the power grid due to overload.

A smart meter 60, which is one of the network components of the smart grid, is a device that becomes a point for discriminating users in-between. And, the smart meter 60 enables user's energy supply and demand to be managed, monitored and controlled.

Functions of the smart meter 60 may include electricity reading, demand response commands, pricing information, connect/disconnect commands and the like. The smart meter 60 is connected to home devices such as a refrigerator, a TV, a washer and the like to configure HAN (home area network). And, the smart meter 60 may be connected to a micro-grid.

The smart meter 60 uses Zigbee, Wifi and the like for wireless communications or power line communication (PLC) and the like for wired communications.

The smart meter 60 may be able to perform interactive communications with a supplier or smart meters via smart grid network.

Thus, the smart meter 60 is a representative device for M2M communication.

Although various examples of usages and applications of the M2M communication, it may be able to consider a situation that a plurality of devices basically perform communications with a base station (BS) or an access point (AP) in a long-term period for their status information transmissions and command receptions by wireless. The device configured to perform the M2M communication is stationary at a specific location or has relatively low mobility. The device configured to perform the M2M communication is provided with a limited battery (e.g., small battery capacity) for downsizing and low cost and performs a transmission of data in relatively small size.

Yet, a base station (BS) or access point (AP) according to a related art fails in having a technology suitable for the M2M communication. For instance, it is highly probable that M2M communication devices may perform communications in a long-term period or may simultaneously perform all communications at a time. Hence, as a plurality of smart meters attempt communications during specific hours, it is highly probable that traffics may increase suddenly. However, the base station or access point of the related art fails in being equipped with the technologies suitable for accepting the M2M communications.

DISCLOSURE OF THE INVENTION

Technical Task

Accordingly, objects of embodiments proposed in this specification are to provide scheduling methods suitable for M2M communications.

Technical Solution

To achieve these and other advantages and in accordance with the purpose of the present invention, according to one embodiment of the present invention, proposed is a method of performing a scheduling by grouping machine devices in M2M communication. In particular, the present invention proposes a method including classifying M2M communication devices having similar transmission patterns and QoS requirements by groping the M2M communication devices, and controlling and scheduling the devices on a group-by-group basis. And, in an embodiment of the present invention, control messages and communication frames related to the control messages are proposed.

As mentioned in the foregoing description, each of the M2M communication devices transmits data in a long-term period in general but differs from a general mobile communication terminal in having features such as transmitting a packet in small size, having low mobility or becoming stationary, having a small-capacity battery loaded therein, and the like. A plurality of the devices having the above-mentioned features may exist within a predetermined area and may have different operation characteristics in accordance with types and purposes of the devices.

According to an embodiment of the present invention, a method of scheduling M2M (machine-to-machine) communication may include receiving an association request message from each of a plurality of devices, transmitting an association response message to the plurality of the devices, grouping the plurality of the devices into one or more groups, transmitting control information including information on devices belonging to each group and information on a time interval assigned to each group to the devices belonging to each group, and communicating with devices belonging to each group at a time interval assigned to each group. The receiving association request message, the transmitting association response message, the grouping, the transmitting information on groups, and the transmitting control information may occur in order of time. Alternatively, after the grouping, the receiving association request message and the transmitting association response message may be performed. In doing so, the information on the groups may be transmitted in a manner of being contained in the association response message. In this case, the grouping may be performed by having the corresponding device included in a previously created group in accordance with an association request made by the corresponding device or creating a new group including the corresponding device. Moreover, the transmitting control information may be periodically performed in a certain period rather than being performed once only. Hence, the device may be able to receive the control information transmitted all the time when transmitting the control information.

Preferably, the communicating may be performed in accordance with scheduling information of the time interval assigned to each group, the scheduling information may be transmitted with contained in a sub-beacon, and the scheduling information may include transmission and reception time information of each device in the corresponding time interval.

Preferably, the control information may be a super beacon message. Preferably, the information on the time interval assigned to each group may include one or more of a start point of the time interval, a size of the time interval, and period information of the time interval.

Preferably, the association request message may be an Association Request message and the association response message may be an Association Response message.

Preferably, the grouping may include grouping the devices having the same or similar transmitting and receiving periods among the plurality of devices into a single group.

Preferably, the scheduling method may further include assigning a time interval to each group.

According to another embodiment of the present invention, an M2M (machine-to-machine) communication method may include transmitting by a machine device an association request message to an access point, receiving by a machine device information on a group to which the machine device belongs from the access point, receiving control information including information on other devices belonging to the machine device belonging group and information on a time interval assigned to the machine device belonging group from the access point, operating in a sleep state until arriving in the time interval using the control information, receiving schedule information in the time interval by entering a communication enabled state from the sleep state if arriving in the time interval, and transmitting and receiving data using the schedule information.

According to still another embodiment of the present invention, an access point supporting M2M (machine-to-machine) communication may include a transceiving unit for receiving an association request message from each of a plurality of devices, transmitting an association response message to a plurality of the devices, and a processor for grouping a plurality of the devices into one or more groups, periodically broadcasting control information including information on the devices belonging to each group and information on a time interval assigned to all created groups to the devices belonging to the each group. In this case, the grouping may be performed by having a corresponding device included in a previously created group in accordance with an association request made by the corresponding device or creating a new group including the corresponding device. Thus, the grouping may be frequently performed in accordance with an association request made by a device.

According to a further embodiment of the present invention, a device may include a transceiving unit for transmitting an association request message to an access point, receiving an association response message from the access point, receiving information on a group to which the machine device belongs from the access point, receiving control information including information on other devices belonging to the machine device belonging group and information on a time interval assigned to the machine device belonging group from the access point, and a processor for operating in a sleep state until arriving in the time interval using the control information, receiving schedule information in the time interval via the transceiving unit if arriving in the time interval, and transmitting and receiving data using the schedule information.

Advantageous Effects

According to the embodiments proposed in this specification, proposed is a method of scheduling machines by grouping in M2M communication.

BEST MODE FOR INVENTION

Figure 1:
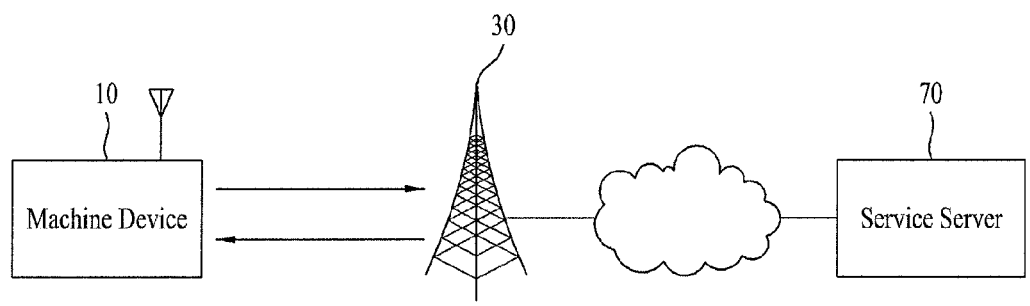
FIG. 1 is a diagram for one example of M2M communication.
Figure 2:
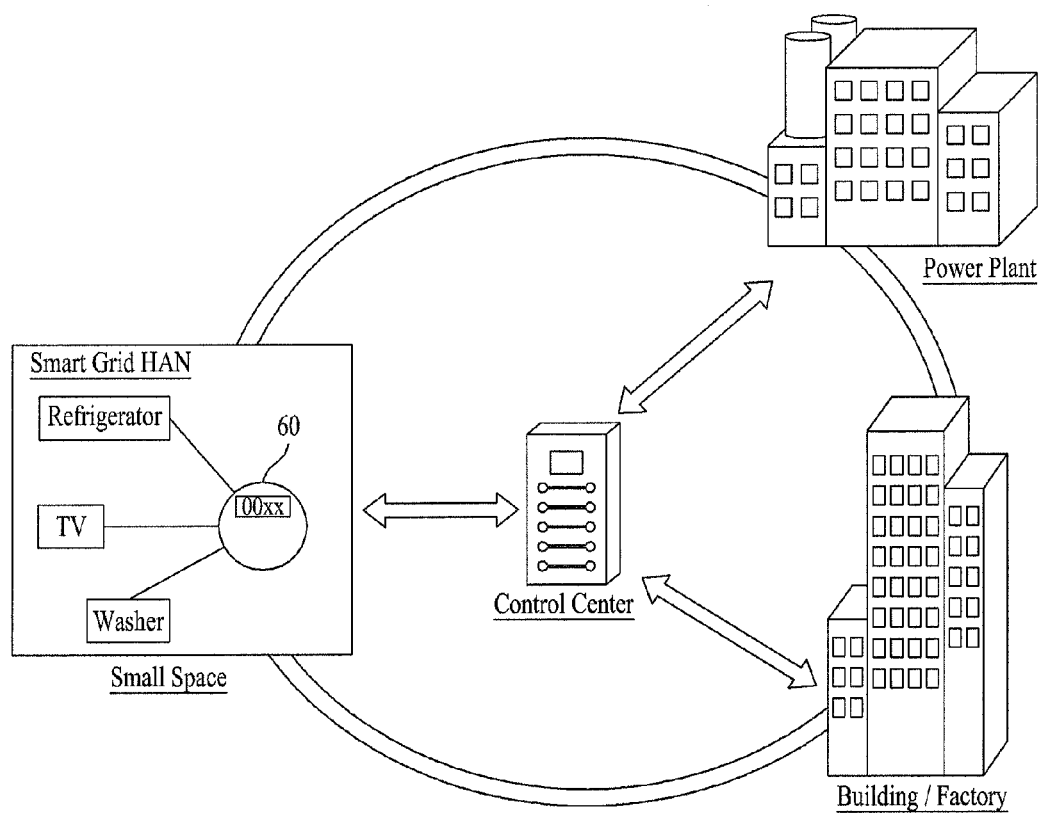
FIG. 2 shows the concept of a smart grid proposed recently and newly.

A technical terminology used in this specification is used to describe a specific embodiment only, by which the present invention may be intentionally non-limited. A technical terminology used in this specification should be construed as a general meaning understandable by those skilled in the art to which the present invention pertains unless defined as a different meaning especially. And, a technical terminology used in this specification should not be construed as an excessively inclusive meaning or an excessively reduced meaning. When a technical terminology used in this specification is an incorrect technical terminology failing to exactly represent the technical idea of the present invention, it may need to be understood by being substituted with a technical terminology that can be correctly understood by those skilled in the art to which the present invention pertains. Moreover, a general terminology used by the present invention should be construed as the definition in dictionary or in accordance with the context and should not be construed as an excessively reduced meaning.

A singular representation used in this specification may include a plural representation unless apparently different in the context of usage. In the present application, such a terminology as 'configure', 'include' and the like should not be construed as necessarily including several components or steps, as not including some of the several components or steps, or as further including additional component(s) or step (s).

A terminology including an ordinal number as $1^{st}$, $2^{nd}$ and the like used in this specification may be usable to describe various components. Yet, each of the components should be non-limited by the terminology including the ordinal number. The terminology including the ordinal number is used only to discriminate one component from another. For instance, a $1^{st}$ component may be named a $2^{nd}$ component without departing from the scope of the appended claims and their equivalents. Similarly, a $2^{nd}$ component may be named a $1^{st}$ component for example.

When a prescribed component is mentioned as 'connected to' or 'accessed by' a different component, it may be directly connected to or accessed by the different component. Yet, another different component may exist in-between. On the contrary, when a prescribed component is mentioned as 'directly connected to' or 'directly accessed by' a different component, it is understood that another different component does not exist in-between.

Reference will now be made in detail to the preferred embodiments of the present invention, examples of which are illustrated in the accompanying drawings. Wherever possible, the same reference numbers will be used throughout the drawings to refer to the same or like parts of which redundant details shall be omitted. Occasionally, to prevent the present invention from getting vaguer in describing the present invention, detailed description of structures and/or devices known to the public shall be omitted. The accompanying drawings are just provided to facilitate the understanding of the technical idea of the present invention, by which the technical idea of the present invention may be non-limited. And, the technical idea of the present invention should be construed as extending to all modifications, equivalents and substitutes as well as to the accompanying drawings.

In the following description, although a terminology called 'device' is used, it may be also called a terminal, a UE (user equipment), an ME (mobile equipment), an MS (mobile station), a UT (user terminal), an SS (subscriber station), an MSS (mobile subscriber station), a wireless device, a handheld device, and AT (access terminal) or the like.

Figure 3:
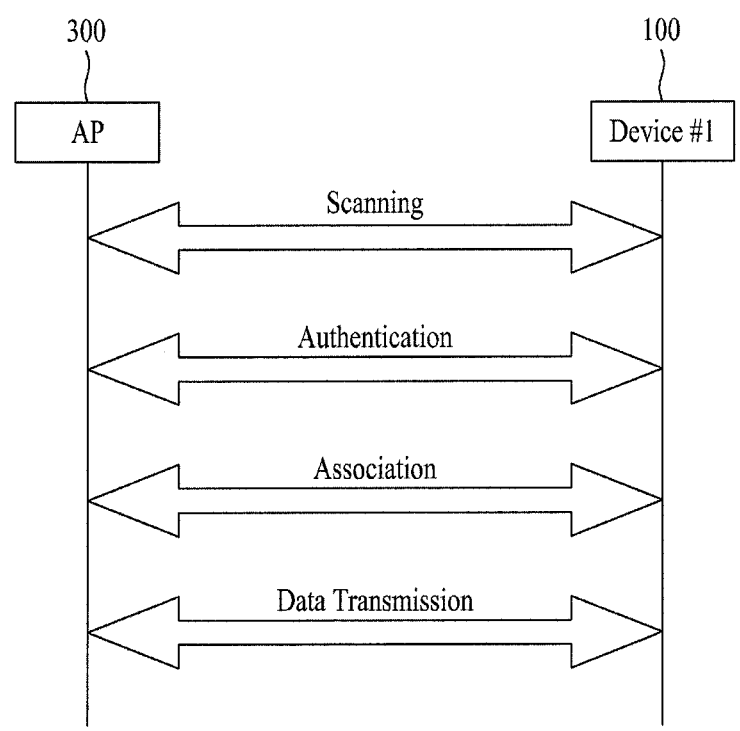
FIG. 3 is an operating flowchart of a combining process for data transmission between an access point 300 and a machine device 100.

FIG. 3 is an operating flowchart of a combining process for data transmission between an access point 300 and a machine device 100.

Referring to FIG. 3, the combining process may include scanning, authentication and association. The machine device 100 and the access point 300 finish the corresponding steps and then perform data transmission.

Scanning is a procedure of searching for an access point 14 around using a beacon or probe message.

The scanning includes passive scanning of searching for the access point 300 based on a beacon message periodically broadcasted by the access point 300 and active scanning of selecting a corresponding access point 300 in a manner that the machine device 100 broadcasts a probe request message or frame (Probe Request) on each channel from the machine device 100 and then receives a probe response message (Probe Response) containing an SSID (Service Set ID) of the access point 300, an operating speed of the access point 300 and the like from the access point 300.

The beacon message contains various capabilities (e.g., speed, encryption, etc.) which can be supported by the access point 300, the SSID (service set ID) which is the access point belonging service group name, and the like.

The authentication is a procedure of proving that the machine device 100 having selected the appropriate access point 300 by scanning is the terminal valid for the corresponding access point. In particular, the authentication is a procedure of negotiating an authentication procedure and an encryption scheme with the access point 300. Since an open system authentication is used in most cases, the access point 300 unconditionally authenticates an authentication request made by the machine device 100. For example of a further reinforced authentication system, there is IEEE 802.1x based EAP-TLS, EAP-TTLS, EAP-FAST, PEAP, or the like.

The association is a procedure that the machine device 100 accesses the access point 300 after successful completion of the authentication.

The association means that an identifiable association is established between the machine device 100 and the access point 300. If the association step is completed, the machine device 100 is able to transmit and receive data via the access point 14.

The association includes transmitting an association request message or frame to the access point from the machine device 100 and transmitting an association response message containing AID (Association ID), which enables the access point 300 to be identifiable from other devices, to the machine device 100 from the access point 300.

Figure 4:
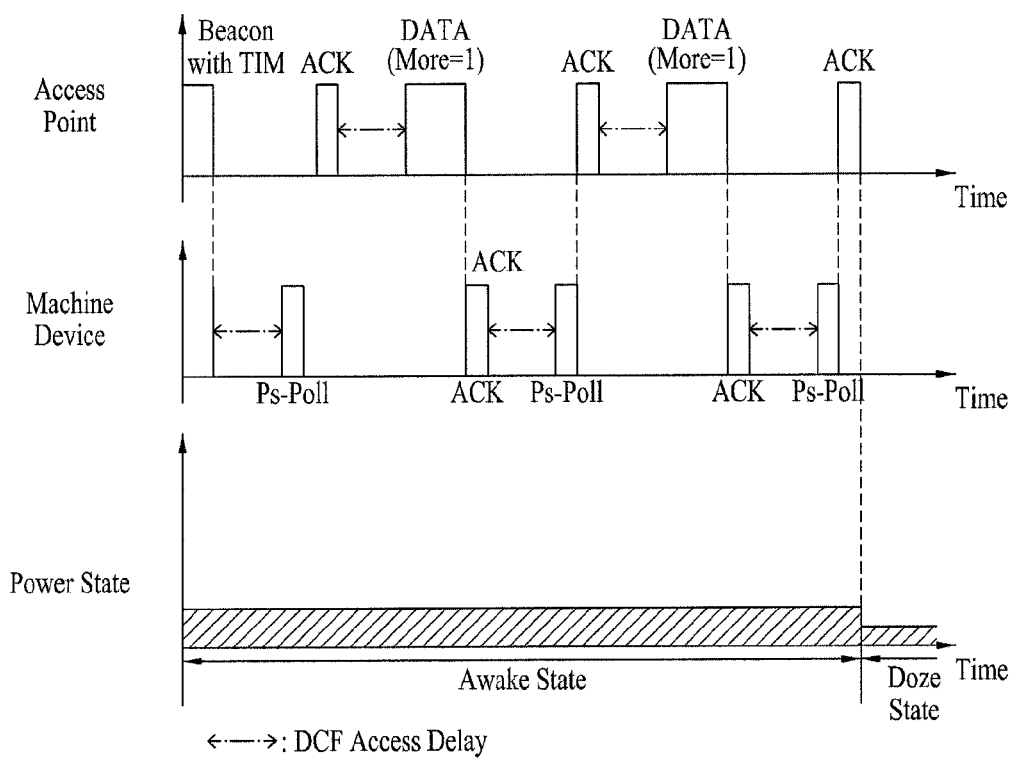
FIG. 4 is a diagram for a power managing method between an access point and a machine.

FIG. 4 is a diagram for a power managing method between an access point and a machine device.

In order to receive data from the access point (AP) 300, the machine device 100 refers to DTIM (Delivery Traffic Indication Message) field contained in a beacon message periodically broadcasted by the access point.

In case that data to be transmitted to the device is generated between the beacon message cycles, the device is able to receive the data after waiting in an awake state as long as a maximum beacon cycle. Since the device has to transmit a PS Poll (Power Save Poll) per each reception of a data frame, the device maintains the awake state.

If the access point has no more data to transmit, the access point transmits an ACK message in response to the PS Poll message transmitted by the device. The device is then able to enter a doze state to reduce its power consumption.

Figure 5:
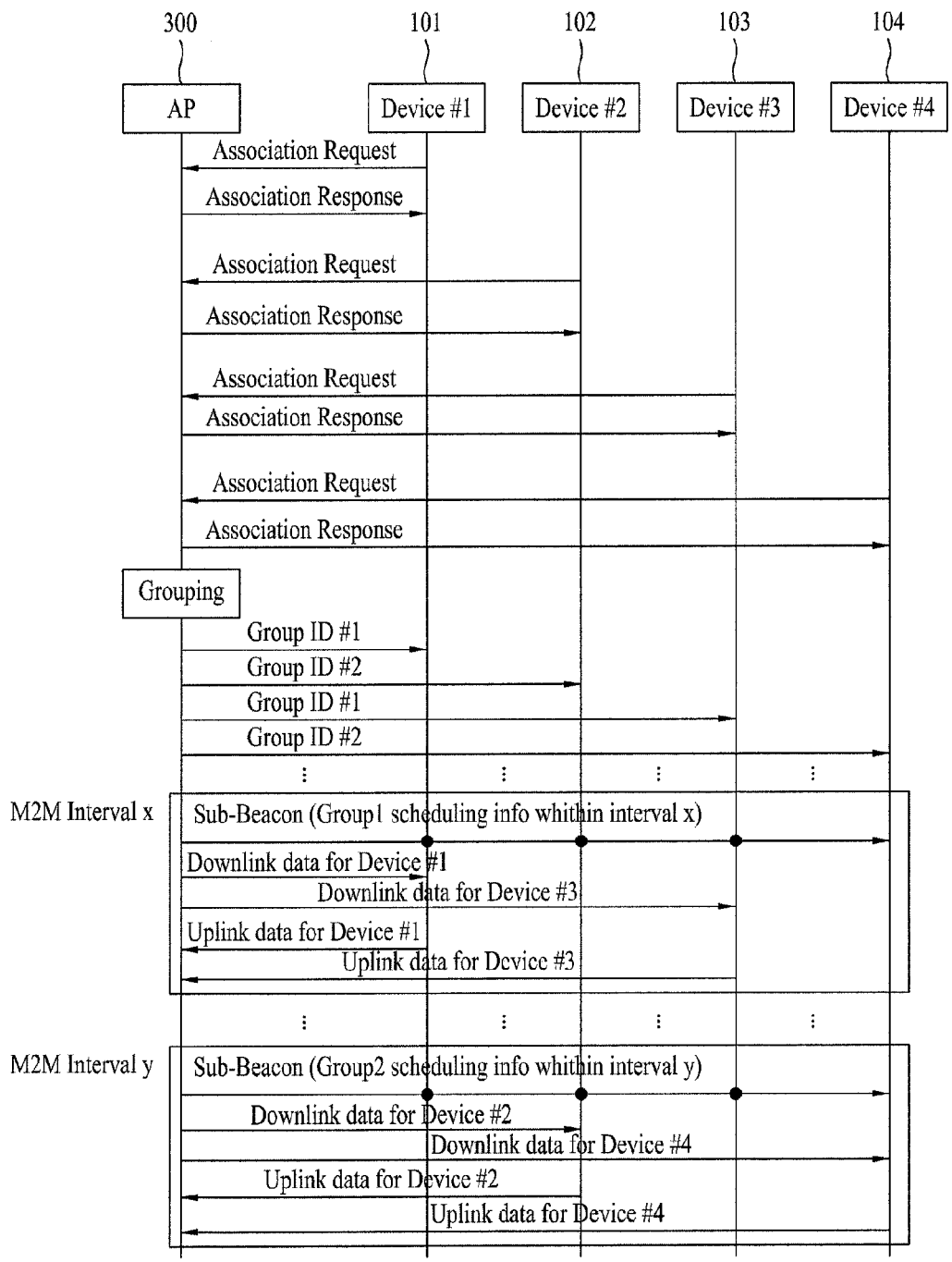
FIG. 5 shows a method of scheduling machines by grouping according to one embodiment of the present invention.

FIG. 5 shows a method of grouping and scheduling machine devices according to an embodiment of the present invention. The method shown in FIG. 5 is performed when an access point (AP) performs grouping for all M2M groups in a certain period. Alternatively, the method shown in FIG. 5 may be performed in an initialization step of the access point (AP).

Referring to FIG. 5, an access point (AP) 300 groups a plurality of machine devices connected to the access point 300. In particular, it can be seen in FIG. 5 that a first device and a third device are grouped into Group 1 and that a second device and a fourth device are grouped into Group 2.

In more particular, each of the first device 101, the second device 102, the third device 103 and the fourth device 104 transmits an association request message (Association Request) or frame to the access point 300. The access point 300 transmits an association response message (Association Response) or frame. Thus, if the association process is completed, the access point 300 groups a plurality of the devices 101 to 104 according to respective operation characteristics. In doing so, devices having the same or similar transmission period (uplink) and the same or similar reception period can be grouped into one group. After completion of the above groping, the access point 300 transmits information on group ID to each of the devices.

Meanwhile, the access point 300 periodically informs each of the corresponding devices of information on the group, to which the corresponding devices belong, in a manner of periodically broadcasting M2M super beacon containing information of grouping the devices and scheduling information of the corresponding group. In this case, the M2M super beacon may contain IDs of all groups set for the corresponding access point, list information of devices belonging to the corresponding group, transmission start times of the groups, transmission interval sizes of the M2M groups, and transmission period information on intervals of the groups.

Figure 6:
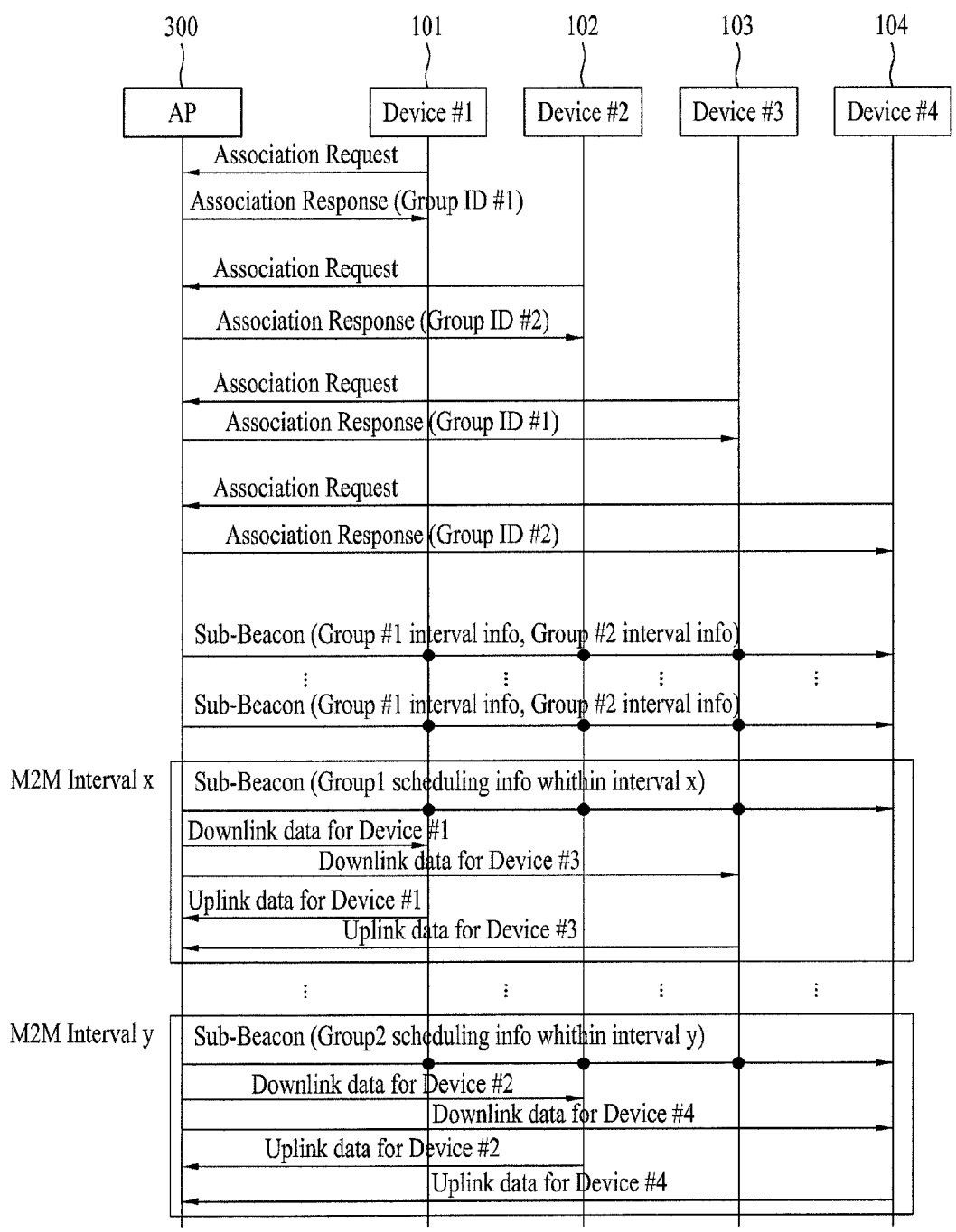
FIG. 6 shows a method of scheduling machines by grouping according to another example of one embodiment of the present invention.

FIG. 6 shows a method of grouping and scheduling machine devices according to another embodiment of the present invention.

FIG. 6 shows that when a new M2M device is connected while a corresponding access point is operating, the corresponding access point performs an operation of enabling the corresponding device to be included in an a previously configured group or configuring a new group in case that the corresponding device is a new type of M2M device. The rest of FIG. 6 is identical to that of FIG. 5.

Figure 7:
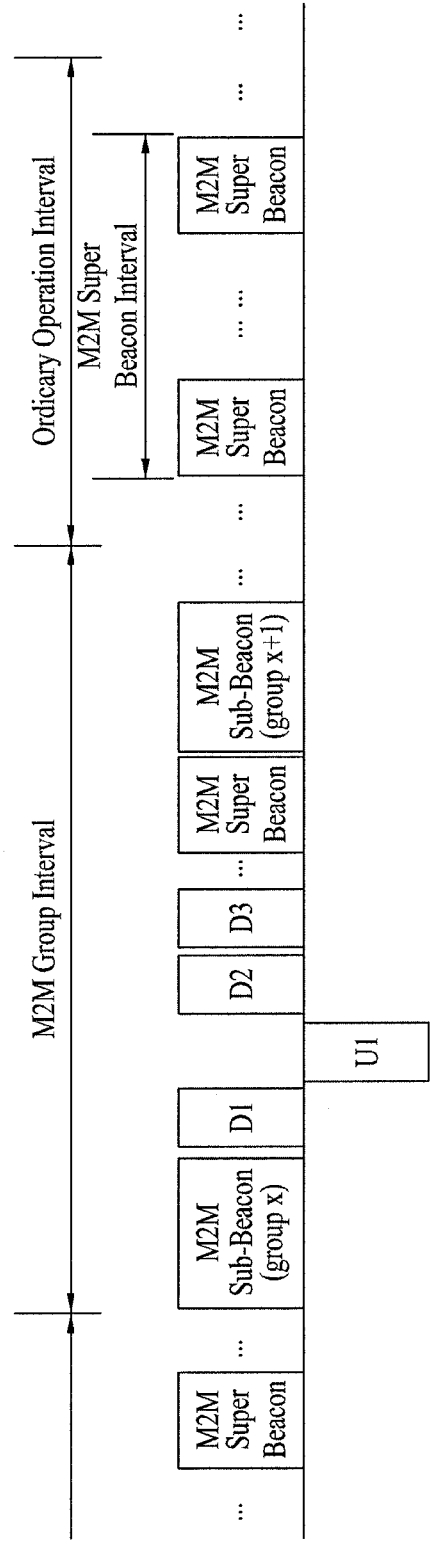
FIG. 7 shows operations of machines in groups to which the machines belong, respectively.

FIG. 7 shows operations of machine devices in respective groups to which the machine devices belong.

Referring to FIG. 7, each of machine devices remains in a reception waiting state to receive an M2M super beacon periodically transmitted from an access point 300. The corresponding M2M super beacon contains interval information on groups configured for the corresponding access point.

Having received the M2M super beacon, a specific machine device operates in a sleep mode until arriving in a group interval of the group to which the specific machine device belongs. In this case, the sleep state means a state that the machine device performs a minimum internal operation of the device to save its battery without performing a communication with the access point 300.

The machine device resumes its operation at a start point of the group interval of the group to which the machine device belongs, receives a sub-beacon for the corresponding interval transmitted from the access point, and then checks scheduling information indicating when the machine device transmits/receives data in the corresponding group interval. Thereafter, having communicated with the access point in accordance with the corresponding scheduling information, the machine device operates in the sleep mode until the next group interval of the group to which the machine device belongs.

The super beacon contains scheduling information on terminals belonging to a specific group within the group interval for the corresponding group. In particular, the super beacon contains information indicating when a specific machine device receives data from the access point and information indicating when the specific machine device transmits data to the access point.

Meanwhile, referring to FIG. 7, an access point periodically transmits an M2M super beacon in an interval for a general terminal which does not support M2M group transmission. Hence, a device which does not belong to a specific group is able to acquire information on the corresponding group and information on a transmission start time and period of the corresponding group interval. Meanwhile, the M2M sub beacon informs transmission scheduling informations of devices in the corresponding M2M group interval in a manner of being transmitted by the access point at a start time of a specific group interval, thereby enabling each of the corresponding devices to perform reception and transmission with the access point in the assigned time.

In FIG. 7, D1 indicates a reception interval of a specific device and U1 indicates a time slot assigned to enable a transmission to an access point.

The above-described method according to the present invention may be implemented by software, hardware or combination of software and hardware. For instance, a method according to the present invention may be saved in a storage medium (e.g., an internal memory, a flash memory, a hard disk, etc.) and may be implemented with codes or commands in a software program executable by a processor (e.g., a microprocessor, etc.). This is described with reference to FIG. 13.

Figure 8:
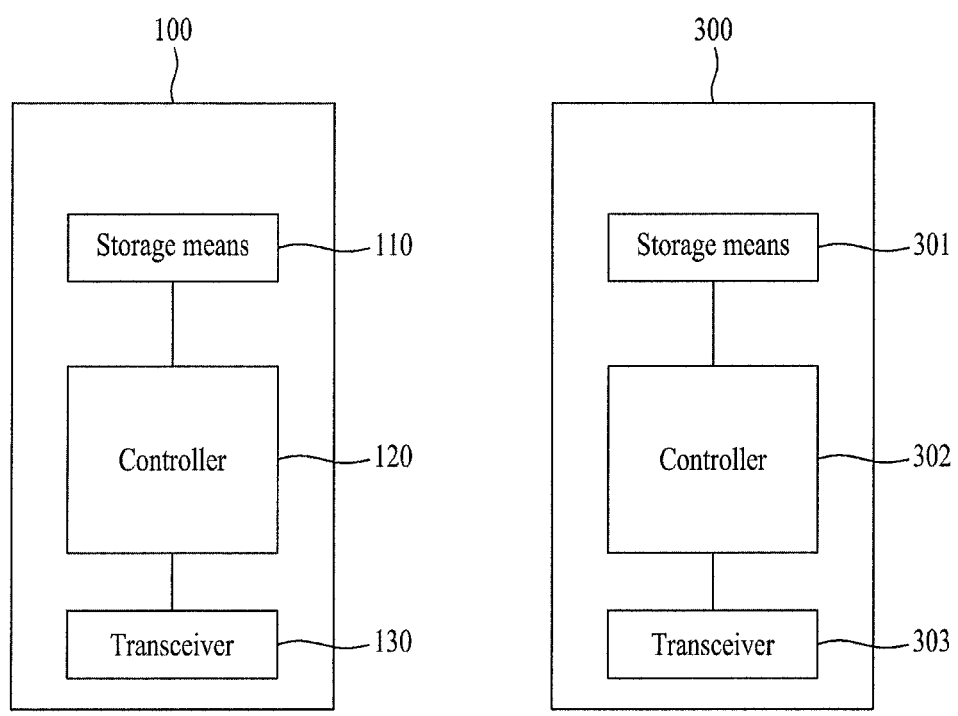
FIG. 8 is a block diagram for configurations of a machine device 100 and an access point 300 according to the present invention.

FIG. 8 is a block diagram for configurations of a machine device 100 and an access point 300 according to the present invention.

Referring to FIG. 8, the machine device 100 includes a storage means 110, a controller 120 and a transceiving unit 130. The access point 300 includes a storage means 310, a controller 320 and a transceiving unit 303.

Each of the storage means 110 and 310 stores the methods described with reference to FIGS. 3 to 7.

The controller 120/320 controls the storage means 110/310 and the transceiving unit 130/330. In particular, the controller 120/320 executes the methods saved in the storage means 110/310. And, the controller 120/320 transmits the aforementioned signals via the transceiving unit 130/330.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of scheduling M2M (machine-to-machine) communication, the method comprising:
receiving, by an access point, an association request message from each of a plurality of devices;
grouping, by the access point, the plurality of devices into one or more groups;
transmitting, by the access point to the plurality of devices, first control information including information indicating devices belonging to each group and information indicating a time interval assigned to each group;
transmitting, by the access point to devices belonging to a specific group, second control information including scheduling information of a time interval assigned to the specific group, the scheduling information indicating an uplink or downlink transmission time for each device belonging to the specific group within the time interval assigned to the specific group; and
communicating, by the access point with the devices belonging to the specific group, at the time interval assigned to the specific group using the transmitted scheduling information,
wherein devices belonging to a same group have a same transmission period, a same reception period, and a same quality of service (QoS) requirement,
wherein the first control information is periodically transmitted to the plurality of devices in all time intervals, and
wherein the second control information is transmitted to the devices belonging to the specific group only at a start time of the time interval assigned to the specific group.

2. The method of claim 1, wherein the first control information is a super beacon message and the second control information is a sub-beacon message.

3. The method of claim 1, wherein the information indicating the time interval assigned to each group comprises one or more of a start point of the time interval assigned to each group, a size of the time interval assigned to each group, and period information of the time interval assigned to each group.

4. The method of claim 1, further comprising transmitting, by the access point to each of the plurality of devices, an association response message in response to a reception of the association request message, wherein the association response message includes association identification information which enables the access point to be identifiable by each of the plurality of devices.

5. The method of claim 1, wherein each device operates in a sleep state until arriving in a time interval assigned to a corresponding group according to the first control information.

6. An M2M (machine-to-machine) communication method, comprising:
transmitting, by a machine device, an association request message to an access point;
receiving, by the machine device from the access point, first control information including information indicating devices belonging to each of one or more groups and information indicating a time interval assigned to each group;
receiving, by the machine device from the access point, second control information including scheduling information of a time interval assigned to a specific group to which the machine device belongs, the scheduling information indicating an uplink or downlink transmission time for each device belonging to the specific group within the time interval assigned to the specific group; and
communicating, by the machine device with the access point, at the time interval assigned to the specific group using the received scheduling information,
wherein devices belonging to a same group have a same transmission period, a same reception period, and a same quality of service (QoS) requirement,
wherein the first control information is periodically received from the access point in all time intervals, and
wherein the second control information is received from the access point only at a start time of the time interval assigned to the specific group.

7. The method of claim 6, wherein the first control information is a super beacon message and the second control information is a sub-beacon message.

8. The method of claim 6, wherein the information indicating the time interval assigned to each group comprises one or more of a start point of the time interval assigned to each group, a size of the time interval assigned to each group, and period information of the time interval assigned to each group.

9. The method of claim 6, further comprising receiving, by the machine device from the access point, an association response message in response to the association request message, wherein the association response message includes association identification information which enables the access point to be identifiable by the machine device.

10. The method of claim 6, wherein each device operates in a sleep state until arriving in a time interval assigned to a corresponding group according to the first control information.

11. An access point supporting M2M (machine-to-machine) communication, the access point comprising:
a transceiving unit configured to:
receive an association request message from each of a plurality of devices,
transmit, to the plurality of devices, first control information including information indicating devices belonging to each group and information indicating a time interval assigned to each group, and
transmit, to devices belonging to a specific group, second control information including schedulin information of a time interval assigned to the specific group, the scheduling information indicating an uplink or downlink transmission time for each device belonging to the specific group within the time interval assigned to the specific group; and
a processor configured to:
group the plurality of devices into one or more groups, and
communicate with the devices belonging to the specific group at the time interval assigned to the specific group using the transmitted scheduling information,
wherein devices belonging to a same group have a same transmission period, a same reception period, and a same quality of service (QoS) requirement,
wherein the first control information is periodically transmitted to the plurality of devices in all time intervals, and
wherein the second control information is transmitted to the devices belonging to the specific group only at a start time of the time interval assigned to the specific group.

12. The access point of claim 11, wherein the first control information is a super beacon message and the second control information is a sub-beacon message.

13. The access point of claim 11, wherein the information indicating the time interval assigned to each group comprises one or more of a start point of the time interval assigned to each group, a size of the time interval assigned to each group, and period information of the time interval assigned to each group.

14. The access point of claim 11, wherein the transceiving unit is further configured to transmit an association response message to each of the plurality of devices in response to the association request message, wherein the association response message includes association identification information which enables the access point to be identifiable by each of the plurality of devices.

15. The access point of claim 11, wherein each device operates in a sleep state until arriving in a time interval assigned to a corresponding group according to the first control information.

16. A machine device comprising:
a transceiving unit configured to:
transmit an association request message to an access point,
receive, from the access point, first control information including information indicating devices belonging to each of one or more groups, and information indicating a time interval assigned to each group, and
receive, from the access point, second control information including scheduling information of a time interval assigned to a specific group to which the machine device belongs, the scheduling information indicating an uplink or downlink transmission time for each device belonging to the specific group within the time interval assigned to the specific group; and
a processor configured to communicate with the access point at the time interval assigned to the specific group using the received scheduling information,
wherein devices belonging to a same group have a same transmission period, a same reception period, and a same quality of service (QoS) requirement,
wherein the first control information is periodically received from the access point in all time intervals, and
wherein the second control information is received from the access point only at a start time of the time interval assigned to the specific group.

17. The machine device of claim 16, wherein the first control information is a super beacon message and the second control information is a sub-beacon message.

18. The machine device of claim 16, wherein the information indicating the time interval assigned to each group comprises one or more of a start point of the time interval assigned to each group, a size of the time interval assigned to each group, and period information of the time interval assigned to each group.

19. The machine device of claim 16, wherein the transceiving unit is further configured to receive an association response message from the access point in response to the association request message, wherein the association response message includes association identification information which enables the access point to be identifiable by the machine device.

20. The machine device of claim 16, wherein the machine device operates in a sleep state until arriving in a time interval assigned to a corresponding group according to the first control information.

* * * * *